(12) United States Patent
Ohashi

(10) Patent No.: US 11,068,220 B2
(45) Date of Patent: Jul. 20, 2021

(54) IMAGE FORMING APPARATUS CAPABLE OF CHANGING SENSITIVITY OF HUMAN BODY DETECTION SENSOR WHEN RECEIVING DISASTER INFORMATION

(71) Applicant: KYOCERA Document Solutions Inc., Osaka (JP)

(72) Inventor: Akira Ohashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/597,233

(22) Filed: Oct. 9, 2019

(65) Prior Publication Data

US 2020/0117409 A1 Apr. 16, 2020

(30) Foreign Application Priority Data

Oct. 15, 2018 (JP) .............................. JP2018-194498

(51) Int. Cl.
 *G06F 3/12* (2006.01)
 *H04N 1/32* (2006.01)
 *G08B 21/22* (2006.01)

(52) U.S. Cl.
 CPC .......... *G06F 3/1273* (2013.01); *G06F 3/1229* (2013.01); *H04N 1/32106* (2013.01); *G08B 21/22* (2013.01)

(58) Field of Classification Search
 CPC . G06F 3/1273; G06F 3/1229; H04N 1/32106; G08B 21/22

USPC ......................................... 358/1.1–1.18, 402
See application file for complete search history.

(56) References Cited

U.S. PATENT DOCUMENTS

| 8,958,088 | B2 | 2/2015 | Uchida | |
|---|---|---|---|---|
| 10,156,581 | B1* | 12/2018 | Cho | H05B 47/115 |
| 2014/0293346 | A1 | 10/2014 | Uchida | |
| 2015/0039673 | A1* | 2/2015 | Shibukawa | H04L 67/12 |
| | | | | 709/202 |
| 2016/0062289 | A1* | 3/2016 | Kawakami | G03G 15/5004 |
| | | | | 399/80 |
| 2016/0150122 | A1* | 5/2016 | Hayama | H04N 1/0084 |
| | | | | 380/243 |
| 2018/0188680 | A1* | 7/2018 | Kato | G06F 3/1221 |
| 2018/0257413 | A1* | 9/2018 | Aoyagi | H04N 1/00108 |

FOREIGN PATENT DOCUMENTS

JP 2014197753 A 10/2014

* cited by examiner

*Primary Examiner* — Gabriel I Garcia
(74) *Attorney, Agent, or Firm* — Studebaker & Brackett PC

(57) ABSTRACT

An image forming apparatus includes an image forming section, a human body sensor, a communication section, and a controller. The image forming section forms an image on a recording medium. The human body sensor detects a human body. The communication section receives disaster information. When the communication section has received the disaster information, the controller controls the human body sensor such that sensitivity of the human body sensor is raised to a level higher than that before reception of the disaster information.

13 Claims, 7 Drawing Sheets

IMAGE FORMING APPARATUS CAPABLE OF CHANGING SENSITIVITY OF HUMAN BODY DETECTION SENSOR WHEN RECEIVING DISASTER INFORMATION

INCORPORATION BY REFERENCE

The present application claims priority under 35 U.S.C. § 119 to Japanese Patent Application No. 2018-194498, filed on Oct. 15, 2018. The contents of this application are incorporated herein by reference in their entirety.

BACKGROUND

The present disclosure relates to an image forming apparatus.

Image forming apparatuses are installed in a large number of workplaces, and a large number of people work in the vicinity of image forming apparatuses. Therefore, an image forming apparatus has been developed that is capable of helping people when a disaster occurs.

For example, an image forming apparatus is known which effectively communicates evacuation procedure information in the event of a disaster. In detail, the image forming apparatus can be used in multiple languages. The image forming apparatus includes storage and an image forming section. The storage stores a language setting history therein. The storage also stores therein evacuation guidance information for the event of a disaster in the multiple languages. The image forming section prints the evacuation guidance information in the language based on the language setting history when a disaster has occurred.

SUMMARY

An image forming apparatus according to an aspect of the present disclosure includes an image forming section, a human body sensor, a communication section, and a controller. The image forming section forms an image on a recording medium. The human body sensor detects a human body. The communication section receives disaster information. The controller controls the human body sensor such that, when the communication section has received the disaster information, sensitivity of the human body sensor is raised to a level higher than that before reception of the disaster information.

DETAILED DESCRIPTION

Figure 1:
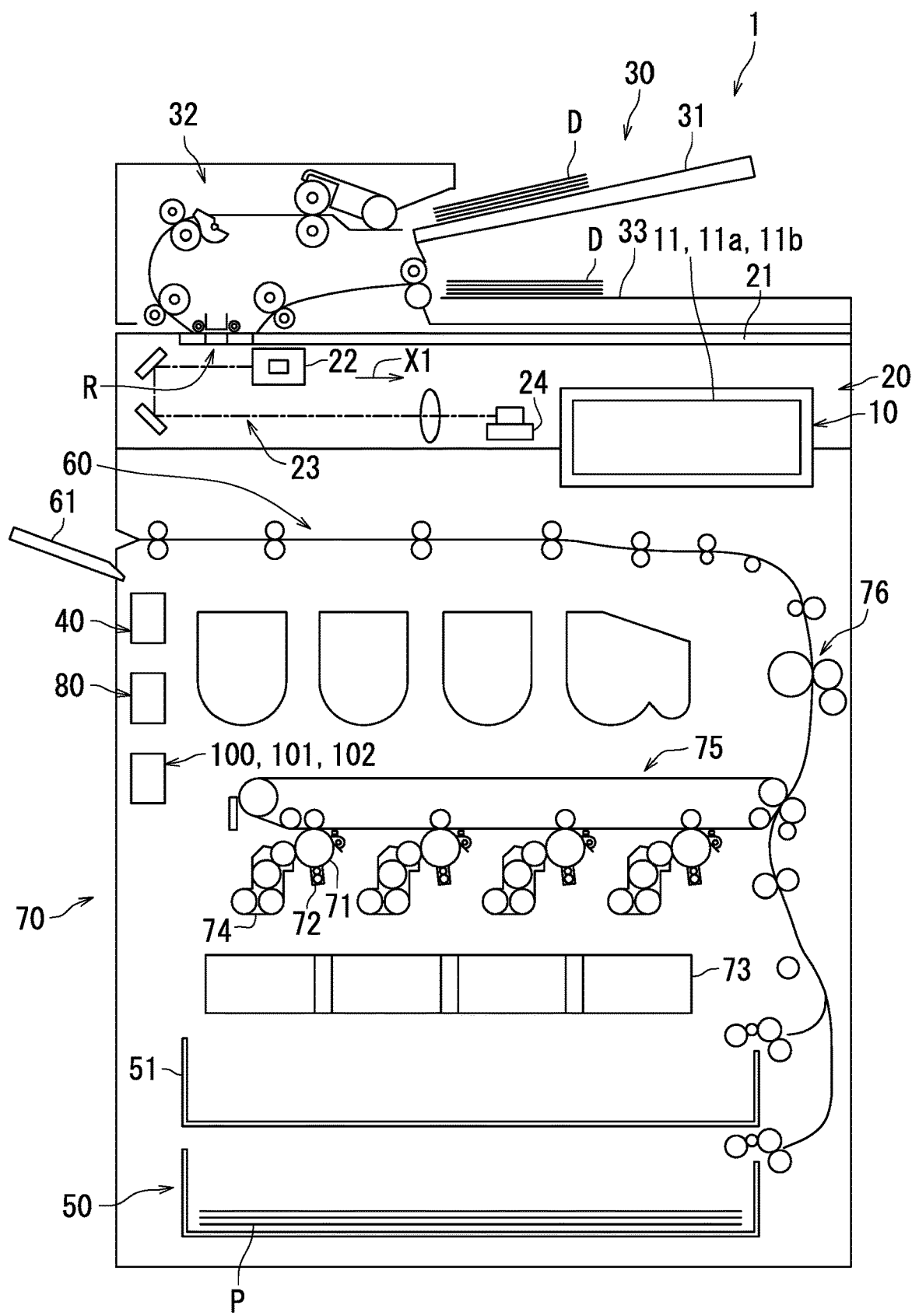
FIG. 1 is a diagram illustrating a configuration of an image forming apparatus according to a first embodiment.

The following describes embodiments of the present disclosure with reference to the accompanying drawings (FIGS. 1 to 7). Elements that are the same or equivalent are labeled with the same reference signs in the drawings and description thereof is not repeated.

First Embodiment

First, an image forming apparatus 1 according to a first embodiment of the present disclosure is described with reference to FIG. 1. FIG. 1 is a diagram illustrating a configuration of the image forming apparatus 1 according to the first embodiment of the present disclosure. The image forming apparatus 1 according to the first embodiment of the present disclosure is a color multifunction peripheral.

As illustrated in FIG. 1, the image forming apparatus 1 forms an image on paper P. The paper P is an example of a recording medium. Examples of the paper P include plain paper, copy paper, recycled paper, thin paper, thick paper, glossy paper, and an overhead projector (OHP) transparency.

As illustrated in FIG. 1, the image forming apparatus 1 includes an operation section 10, a reading section 20, a document conveyance section 30, a communication section 40, a paper feed section 50, a paper conveyance section 60, an image forming section 70, a human body sensor 80, and a controller 100.

The operation section 10 receives operation by a user. The operation section 10 also displays various screens. According to the present embodiment, the operation section 10 includes a touch panel 11. The touch panel 11 has a display 11a and a touch sensor 11b. The display 11a is an example of a display section.

The display 11a displays various screens. Examples of the display 11a include a liquid-crystal display and an organic electroluminescent (EL) display.

The touch sensor 11b receives operation by the user. The touch sensor 11b is superimposed on the display surface of the display 11a.

The reading section 20 reads a document D to generate image information. The reading section 20 includes a platen 21, a light source unit 22, an optical system 23, and an imaging device 24. The platen 21 is typically made from glass. The light source unit 22 includes a light source such as a light-emitting diode (LED) and a reflecting mirror. The light source unit 22 irradiates the document D placed on the platen 21 with light while moving in a sub-scanning direction X1. Light reflected from the document D is input to the optical system 23. The optical system 23 guides the reflected light to the imaging device 24, and the imaging device 24 captures the reflected light to generate image data. The imaging device 24 includes an image sensor such as a charge-coupled device.

The document conveyance section 30 conveys the document D such that the document D passes a prescribed document reading position R. The document conveyance section 30 includes a document loading tray 31, a document conveyor device 32, and a document exit tray 33. The document D placed on the document loading tray 31 is conveyed to the document exit tray 33 a sheet at a time by the document conveyor device 32.

In detail, the document conveyor device 32 includes a plurality of guide plates and a plurality of conveyance roller pairs. The guide plates form a prescribed conveyance path, and the conveyance roller pairs are located along the prescribed conveyance path. The document D is conveyed by the conveyance roller pairs rotating. Specifically, the document D is conveyed to the document exit tray 33 by way of the document reading position R.

When the document conveyance section 30 conveys the document D, the light source unit 22 of the reading section 20 moves to a position opposite to the document reading position R. The light source unit 22 irradiates the document D with light through the platen 21 as the document D passes the document reading position R. As a result, the reflected light from the document D is guided to the imaging device 24. The imaging device 24 captures the reflected light to generate image data.

The communication section 40 connects to a network such as a local area network (LAN) or a public telephone line. The communication section 40 performs communication with a server such as an information providing server. The information providing server provides disaster information. The communication section 40 also performs communication with a terminal such as a smartphone. Specifically, the communication section 40 sends an email to a terminal such as a smartphone. The communication section 40 is for example a network interface such as a LAN board.

The paper feed section 50 houses multiple sheets of the paper P, and feeds the paper P a sheet at a time to the paper conveyance section 60. The paper feed section 50 includes an attachable and detachable cassette 51. The cassette 51 houses the multiple sheets of paper P.

The paper conveyance section 60 conveys the paper P along a prescribed conveyance path. The paper conveyance section 60 includes an exit tray 61, a plurality of guide plates, and a plurality of conveyance roller pairs. The guide plates form the prescribed conveyance path, and the conveyance roller pairs are located along the prescribed conveyance path. The paper P is conveyed by the conveyance roller pairs rotating. In detail, the paper P is conveyed to the exit tray 61 by way of the image forming section 70.

The image forming section 70 forms an image on the paper P conveyed by the paper conveyance section 60.

According to the present embodiment, the image forming section 70 forms an image on the paper P electrographically. In other words, the image forming section 70 forms an image on the paper P using toner. The image forming section 70 includes a photosensitive drum 71, a charger 72, a light exposure device 73, a development device 74, a transfer device 75, and a fixing section 76.

The charger 72 charges the photosensitive drum 71. The light exposure device 73 irradiates the charged photosensitive drum 71 with laser light. Through the above, an electrostatic latent image is formed on the surface of the photosensitive drum 71. The development device 74 supplies the toner to the surface of the photosensitive drum 71. As a result, the electrostatic latent image is developed and a toner image is formed.

The transfer device 75 transfers the toner image to the paper P. According to the present embodiment, the transfer device 75 secondarily transfers the toner image to the paper P.

The fixing section 76 includes a heating member and a pressure member. The heating member and the pressure member are located opposite to each other and form a fixing nip. The paper P with the toner image formed thereon receives heat and pressure by passing through the fixing nip. As a result, the toner image formed on the paper P is fixed to the paper P.

The human body sensor 80 detects a human body. The human body sensor 80 detects a human body within a detection range. Upon detecting a human body within the detection range, the human body sensor 80 sends a signal indicating that a human body has been detected to the controller 100. The human body sensor 80 is a pyroelectric infrared sensor or an ultrasonic sensor, for example.

In a case where the human body sensor 80 is a pyroelectric infrared sensor, the human body sensor 80 detects a human body upon for example receiving infrared rays emitted by the human body in the detection range in the vicinity of the image forming apparatus 1. In detail, the pyroelectric infrared sensor detects a human body based on a change in infrared rays emitted by the human body in the detection range.

In a case where the human body sensor 80 is an ultrasonic sensor, the human body sensor 80 detects a human body based on a period between transmission of ultrasonic waves and reception of the ultrasonic waves. In detail, the ultrasonic sensor measures a period between transmission of ultrasonic waves and reception of the ultrasonic waves. The ultrasonic sensor detects presence of a human body according to whether or not the measured period is within a specific period. The defined period corresponds to the detection range. Specifically, when a human body is present in the detection range, a measured period in which the human body sensor 80 emits ultrasonic waves, the ultrasonic waves are reflected by the human body, and the human body sensor 80 receives the ultrasonic waves falls within the specific period. Accordingly, the ultrasonic sensor sends a signal indicating that a human body has been detected to the controller 100 when the measured period is within the specific period.

The controller 100 controls operation of each section of the image forming apparatus 1. The controller 100 includes a processor 101 and storage 102.

The processor 101 performs various processes by executing a control program stored in the storage 102. The processes include numerical calculation, information processing, and machine control. The processor 101 is a central processing unit (CPU) or a microprocessing unit (MPU), for example.

The storage 102 stores the control program and various information therein. The storage 102 is constituted by a hard-disk drive (HDD), random-access memory (RAM), and read-only memory (ROM).

Figure 2:
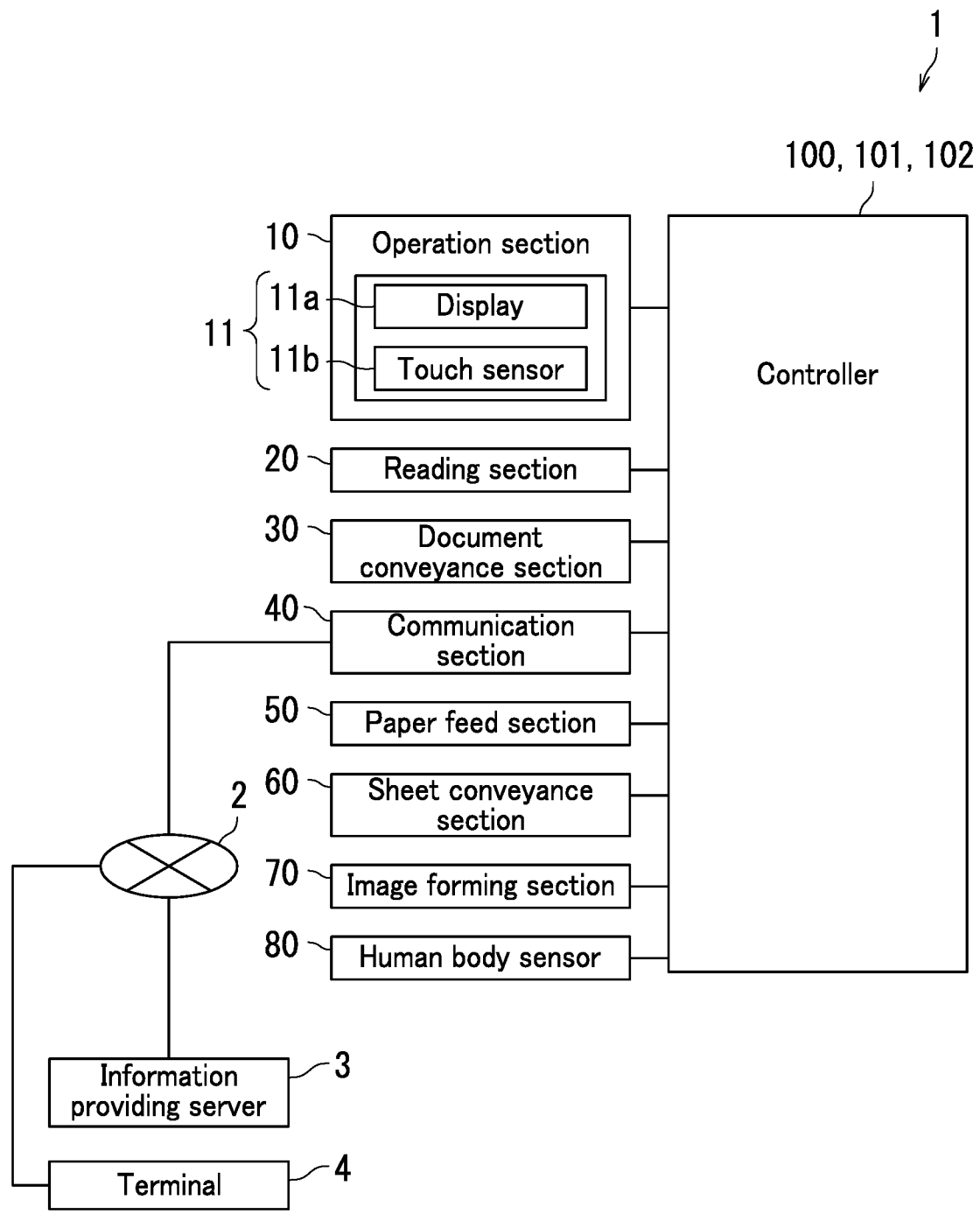
FIG. 2 is a block diagram of the image forming apparatus according to the first embodiment.

Next, the image forming apparatus 1 according to the first embodiment of the present disclosure is further described with reference to FIG. 2. FIG. 2 is a block diagram of the image forming apparatus 1 according to the first embodiment of the present disclosure. As illustrated in FIG. 2, the image forming apparatus 1 can send and receive information between an information providing server 3 and a terminal 4 through a network 2.

The information providing server 3 provides disaster information to the image forming apparatus 1 through the network 2. The disaster information includes earthquake information, tsunami information, volcano information, weather information, and information pertaining to an emergency. Earthquake information is an earthquake early warning, for example. Tsunami information is a major tsunami warning, for example. Volcano information is an eruption warning, for example. Weather information is a heavy rainfall special warning, for example. Information pertaining to an emergency is a ballistic missile warning, for example. The terminal 4 is an external terminal. The terminal 4 is a terminal used by a corporate emergency manager, for example. The terminal 4 is a smartphone, for example.

When the communication section 40 has received the disaster information, the controller 100 controls the human body sensor 80 such that the sensitivity of the human body sensor 80 is raised to a level higher than that before reception of the disaster information. In other words, the controller 100 increases the detection range of the human body sensor 80.

Specifically, in a case where the human body sensor 80 is a pyroelectric infrared sensor, the controller 100 increases the amplification of the amplifier of the pyroelectric infrared sensor to increase the sensitivity (increase the detection range). In a case where the human body sensor 80 is an ultrasonic sensor, the controller 100 lengthens the specific period with respect to the measured period to increase the sensitivity (increase the detection range).

The controller 100 may increase the strength of the ultrasonic waves emitted by the human body sensor 80. Specifically, the controller 100 may increase electric power applied to the human body sensor (pyroelectric infrared sensor) 80.

The first embodiment is described above with reference to FIGS. 1 and 2. According to the present embodiment, the sensitivity of the human body sensor 80 is increased in the event of a disaster. In other words, the detection range of the human body sensor 80 is increased in the event of a disaster. Accordingly, possibility of detecting a person who is slow to escape in the event of a disaster is increased. In other words, possibility of a person who is slow to escape being overlooked can be reduced. As a result, convenience of the image forming apparatus 1 in the event of a disaster can be improved.

For example, the image forming apparatus 1 can be used as a notification apparatus which notifies the emergency manager that there is a person who is slow to escape.

Second Embodiment

The following describes a second embodiment of the present disclosure with reference to FIGS. 1 to 4. According to the second embodiment, the image forming apparatus 1 sends detection information to the terminal 4 upon detecting a human body after receiving the disaster information. The detection information includes information indicating that a human body has been detected. The owner of the terminal 4 can confirm whether or not there is a person who is slow to escape by receiving detection information.

Specifically, the controller 100 sends the detection information to the terminal 4 when the human body sensor 80 has detected a human body after the disaster information has been received and the sensitivity of the human body sensor 80 has been raised. The detection information includes, in addition to information indicating that a human body has been detected, information indicating an installation location of the image forming apparatus 1 which has detected the human body. The detection information is sent using email, for example.

Figure 3:
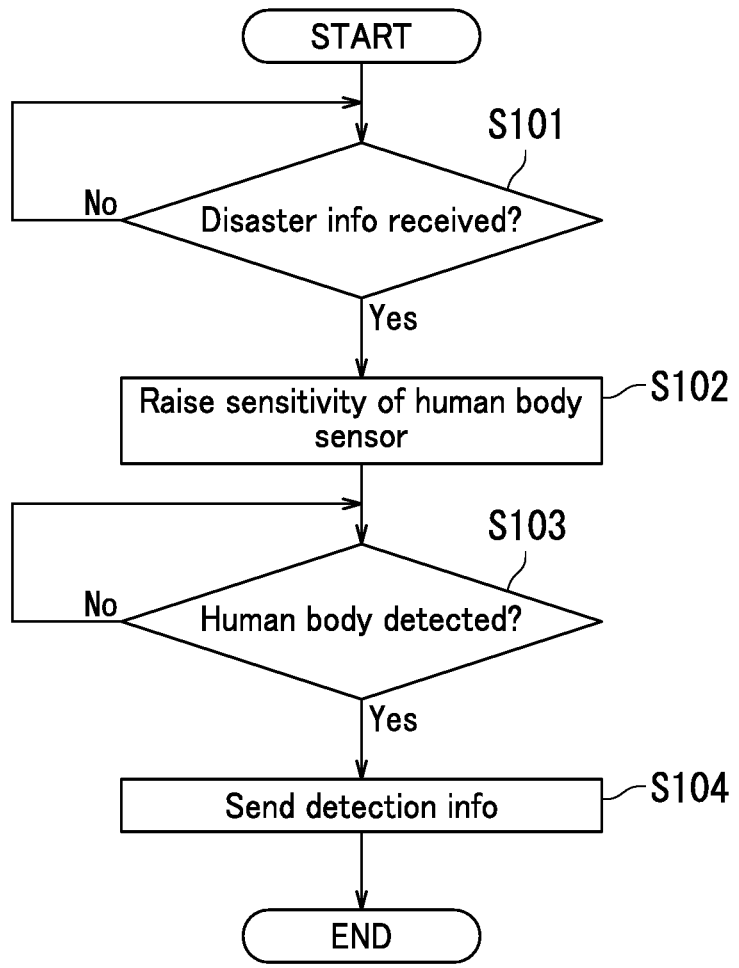
FIG. 3 is a flowchart depicting operation of the image forming apparatus according to a second embodiment.
Figure 4:
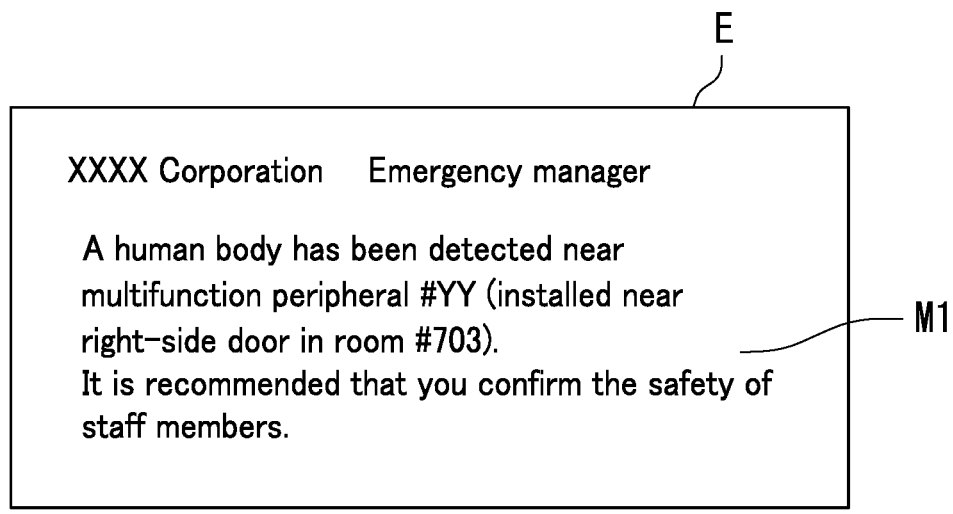
FIG. 4 is a diagram illustrating an example of a text body of an email according to the second embodiment.

Next, operation of the image forming apparatus 1 according to the present embodiment is described with reference to FIGS. 2 to 4. FIG. 3 is a flowchart depicting operation of the image forming apparatus 1. The operation of the image forming apparatus 1 depicted in FIG. 3 is started by the user activating the image forming apparatus 1.

In Step S101, the controller 100 determines whether or not the communication section 40 has received the disaster information. When the controller 100 determines that the disaster information has been received (Yes in Step S101), the operation advances to Step S102. When the controller 100 determines that the disaster information has not been received (No in Step S101), the operation returns to Step S101.

In Step S102, the controller 100 raises the sensitivity of the human body sensor 80. The controller 100 increases electric power applied to the human body sensor 80. The operation advances to Step S103.

In Step S103, the human body sensor 80 determines whether or not a human body has been detected. When the human body sensor 80 determines that a human body has been detected (Yes in Step S103), the operation advances to Step S104. When the human body sensor 80 determines that a human body has not been detected (No in Step S103), the operation repeats Step S103.

In Step S104, the controller 100 controls the communication section 40 to send detection information the terminal 4. The operation depicted in FIG. 3 ends when the communication section 40 sends the detection information. According to the present embodiment, the controller 100 controls the communication section 40 to send the detection information using email E.

Continuing, the email E is described with reference to FIG. 4. FIG. 4 is a diagram illustrating an example of a text body of an email according to the first embodiment. As illustrated in FIG. 4, the email E includes a message M1. The message M1 includes indication that the image forming apparatus 1 has detected a human body, a management number of the image forming apparatus 1, the installation location of the image forming apparatus 1, and a recommendation to confirm safety.

According to the present embodiment as described above with reference to FIGS. 1 to 4, the image forming apparatus 1 sends the detection information to the terminal 4 upon detecting a human body after receiving the disaster information. As a result, the emergency manager or the like can receive the detection information and confirm the presence of a person who is slow to escape.

Third Embodiment

The following describes a third embodiment of the present disclosure with reference to FIGS. 1, 2, 5, and 6. According to the third embodiment, the image forming apparatus 1 controls the display 11a to display an image G relating to the disaster information when the communication section 40 receives the disaster information. Through the above, escape from a disaster can be facilitated for a person near the image forming apparatus 1. As a result, injury due to disaster can be reduced.

Specifically, the controller 100 controls the display 11a to display the image G relating to the disaster information upon receiving the disaster information.

The image G relating to the disaster information includes an image exhibiting an evacuation route, for example. The image exhibiting the evacuation route is for example an image exhibiting a travel route from the current location to the nearest evacuation site. The image exhibiting the evacuation route is prestored in the storage 102 of the controller 100.

Figure 5:
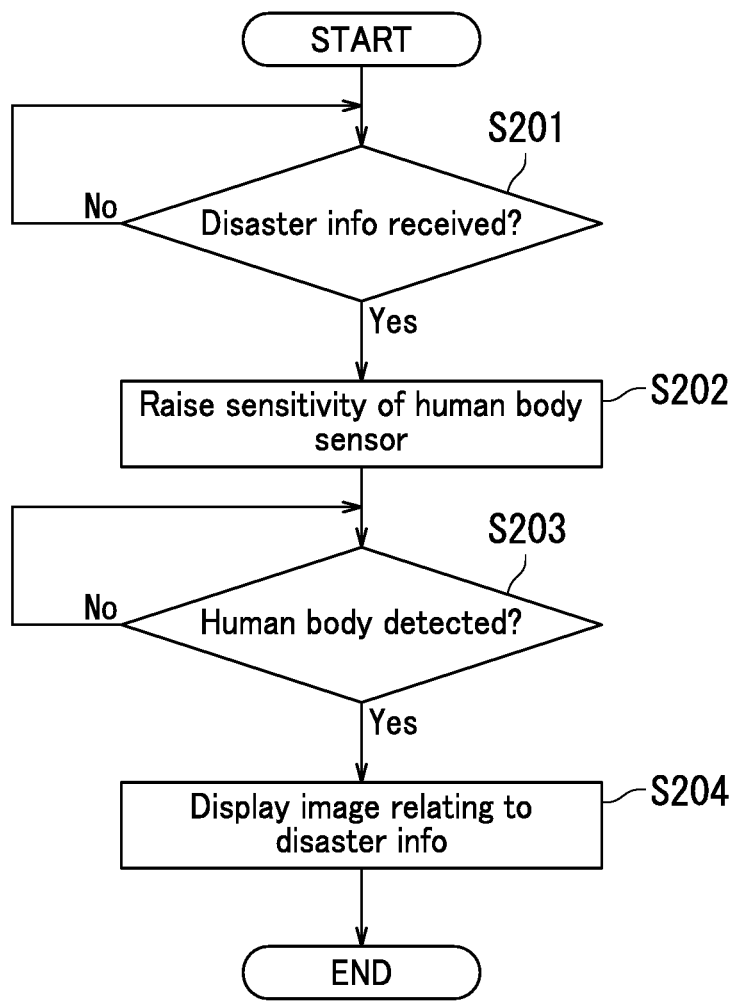
FIG. 5 is a flowchart depicting operation of the image forming apparatus according to a third embodiment.
Figure 6:
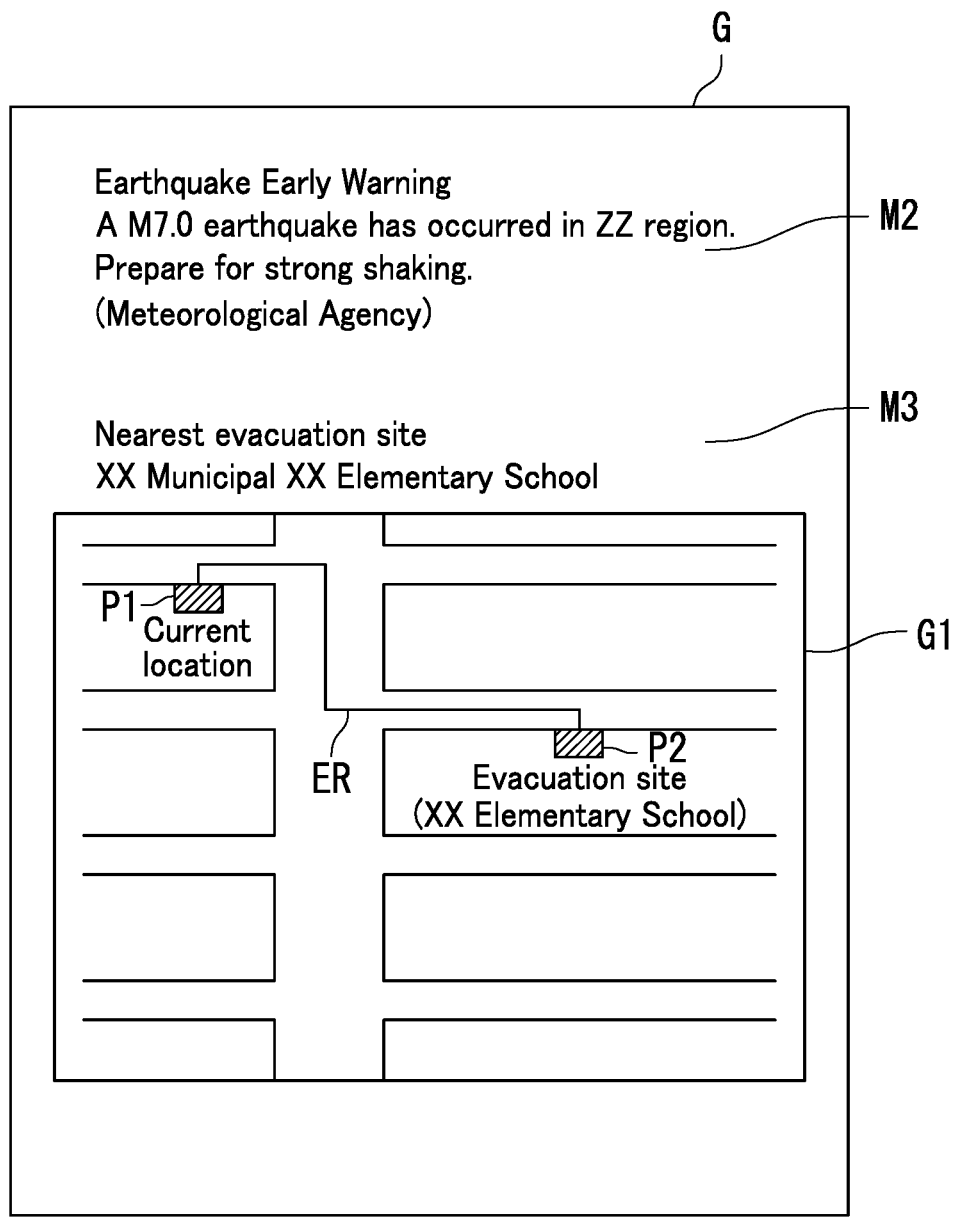
FIG. 6 is a diagram illustrating an image relating to disaster information according to the third embodiment.

Next, the operation of the image forming apparatus 1 according to the present embodiment is described with reference to FIGS. 2, 5, and 6. FIG. 5 is a flowchart depicting operation of the image forming apparatus 1 according to the third embodiment. The operation depicted in FIG. 5 is started by the user activating the image forming apparatus 1.

Note that in the operation depicted in FIG. 5, Step S204 is performed instead of Step S104 of the operation described with reference to FIG. 3. In other words, Steps S201 to Step S203 in FIG. 5 are the same as Steps S101 to S103 described with reference to FIG. 3, respectively. Therefore, description of Steps S201 to S203 in FIG. 5 is omitted.

In Step S204, the controller 100 causes the display 11a to display the image G relating to the disaster information. When the display 11a displays the image G relating to the disaster information, the operation depicted in FIG. 5 ends.

Continuing, the image G relating to the disaster information is described with reference to FIG. 6. FIG. 6 is a diagram illustrating the image G relating to the disaster information according to the third embodiment. As illustrated in FIG. 6, the image G includes a message M2, a message M3, and an image G1. The message M2 exhibits an earthquake early warning indicating that an earthquake has occurred. The message M3 exhibits the nearest evacuation site. The image G1 includes a "current location" P1, an "evacuation site (X Elementary School)" P2, and an evacuation route ER. The "current location" P1 is the installation location of the image forming apparatus 1. The "evacuation site (X Elementary School)" P2 is the nearest evacuation site. The evacuation route ER is a route from the "current location" P1 to the "evacuation site (X Elementary School)" P2.

The image G1 may include the installation location of a fire extinguisher or a guidance route to a fire extinguisher. The image G1 may also include the installation location of an automated external defibrillator (AED) or a guidance route to an AED. The image G1 may also include the location of emergency food storage or a guidance route to emergency food storage.

According to the present embodiment as described above with reference to FIGS. 1, 2, 5, and 6, the controller 100 causes the display 11a to display the image G relating to the disaster information when the communication section 40 receives the disaster information. Through the above, escape from a disaster is facilitated for a person near the image forming apparatus 1. As a result, injury due to disaster can be reduced.

Fourth Embodiment

Figure 7:
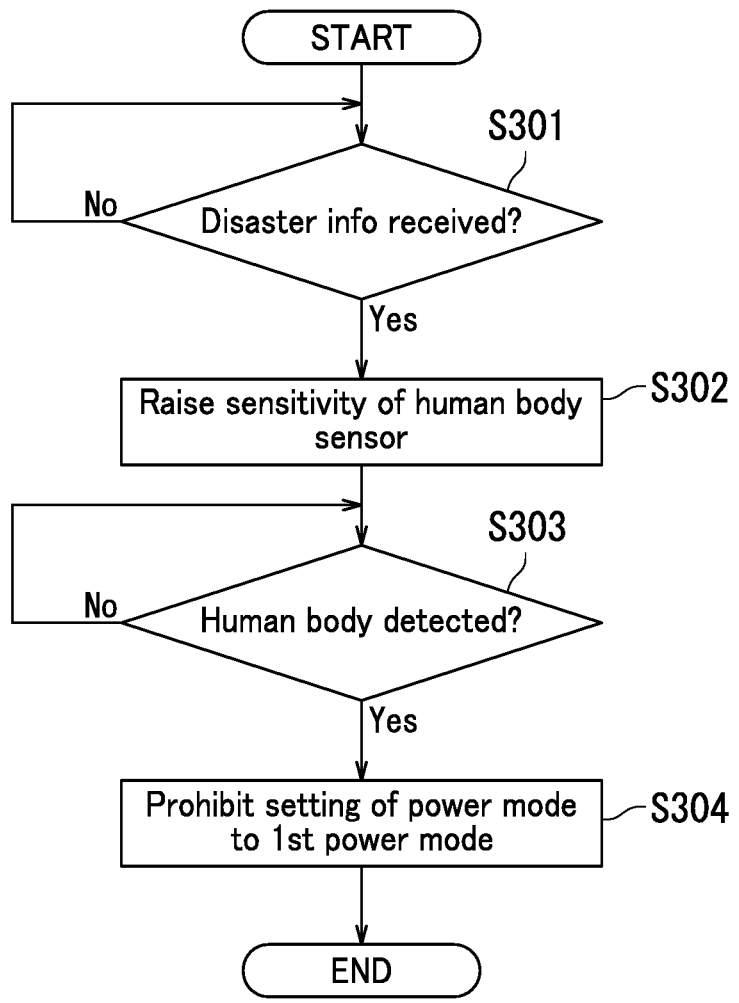
FIG. 7 is a flowchart depicting operation of the image forming apparatus according to a fourth embodiment.

The following describes a fourth embodiment of the present disclosure with reference to FIGS. 1, 2, and 7. According to the fourth embodiment, setting of the power mode of the image forming apparatus 1 to a power mode that generates a large amount of heat is prohibited when the communication section 40 receives the disaster information. Through the above, the image forming apparatus 1 can reduce a possibility of causing a secondary fire.

Specifically, the image forming apparatus 1 has a first power mode and a second power mode which are power modes for supplying electric power to the fixing section 76. The first power mode is a power mode in which electric power is supplied to the fixing section 76 such that preparation for fixing an image to the paper P has been completed. More specifically, the first power mode is a power mode in which the temperature of the fixing section 76 is kept at a temperature capable of fixing a toner image to the paper P. The second power mode is a power mode in which electric power is either not supplied to the fixing section 76 or is supplied to the fixing section 76 at a lower level than in the first power mode.

The controller 100 prohibits setting of the power mode of the image forming apparatus 1 to the first power mode and sets the power mode of the image forming apparatus 1 to the second power mode upon receiving the disaster information.

The controller 100 may control the display 11a to light up when the human body sensor 80 has detected a human body after reception of disaster information. In this case, the display 11a lights up whenever a person approaches the image forming apparatus 1 even after the disaster information has been received. Therefore, the possibility of a person who is slow to escape from a disaster colliding with the image forming apparatus 1 can be reduced even when lighting fails due to the disaster. Also, the controller 100 may cause the display 11a to display the image G relating to the disaster information described according to the third embodiment when the human body sensor 80 has detected a human body after reception of the disaster information.

Next, the operation of the image forming apparatus 1 according to the present embodiment is described with reference to FIGS. 1, 2, and 7. FIG. 7 is a flowchart depicting the operation of the image forming apparatus 1 according to the fourth embodiment. The operation depicted in FIG. 7 is started by the user activating the image forming apparatus 1.

Note that in the operation depicted in FIG. 7, Step S304 is performed instead of Step S104 in the operation described with reference to FIG. 3. In other words, Steps S301 to S303 in FIG. 7 are the same as Steps S101 to S103 described with reference to FIG. 3, respectively. Therefore, description of Steps S301 to S303 in FIG. 7 is omitted.

In Step S304, the controller 100 prohibits the power mode of the image forming apparatus 1 from being set to the first power mode and sets the power mode to the second power mode, and the operation depicted in FIG. 7 ends. Note that the controller 100 may control the display 11a to light up when the human body sensor 80 has detected a human body.

According to the present embodiment as described above with reference to FIGS. 1, 2, and 7, the image forming apparatus 1 is prohibited from being set to the first power mode, in which the amount of generated heat is high, after the communication section 40 has received the disaster information. As a result, occurrence of a fire from the image forming apparatus 1 in the event of a disaster becomes less likely.

Embodiments of the present disclosure are described so far with reference to the accompanying drawings. According to the embodiments of the present disclosure as illustrated in FIGS. 1 to 7, when the communication section 40 receives the disaster information, the sensitivity of the human body sensor 80 is increased to contribute to provision of information pertaining to confirmation of victims, an evacuation route, the installation location of a fire extinguisher, the installation location of an AED, and emergency food storage and reduction in occurrence of a secondary fire. Accordingly, the convenience of the image forming apparatus 1 in the event of a disaster can be improved.

However, the present disclosure is not limited to the above embodiment, and can be implemented in various ways within a scope not departing from the gist thereof (as below in (1) to (5), for example). The drawings illustrate main elements of configuration schematically to facilitate understanding thereof. Aspects of the elements of configuration such as thickness, length, and number in the drawings may differ in practice for the sake of convenience for drawing preparation. Furthermore, shapes of the elements of configuration illustrated in the above embodiments are examples and are not particularly limited. The elements of configuration may be variously altered within a scope not substantially departing from the configuration of the present disclosure.

(1) In the first to fourth embodiments as described with reference to FIGS. 1 to 7, the image forming apparatus 1 is an electrographic multifunction peripheral. However, the present disclosure is not limited as such. The image forming apparatus 1 may be an inkjet recording multifunction peripheral, for example.

(2) In the first to fourth embodiments, the image forming apparatus 1 is a color multifunction peripheral. However, the present disclosure is not limited as such. The present disclosure may also be applied to a monochrome multifunction peripheral, a color copy machine, or a monochrome copy machine.

(3) In the second embodiment, the detection information is sent using the email E. However, the present disclosure is not limited as such. The detection information may also be sent to a dedicated application installed on the terminal 4, for example.

(4) In the third embodiment, the image G1 exhibiting the evacuation route ER is prestored in the storage 102. However, the present disclosure is not limited as such. The information providing server 3 or a server other than the information providing server 3 may store therein the image G1 exhibiting the evacuation route ER, and may send the image G1 to the image forming apparatus 1 along with the disaster information.

(5) In the fourth embodiment, the power supply of the image forming apparatus 1 is not disconnected. However, the present disclosure is not limited as such. The image forming apparatus 1 may also disconnect the power supply upon receiving the disaster information. Through the above, occurrence of a secondary fire can be further reduced.

What is claimed is:

1. An image forming apparatus comprising:
   an image forming section configured to form an image on a recording medium;
   a human body sensor configured to detect a human body;
   a communication section configured to receive disaster information; and
   a controller configured to control the human body sensor such that, when the communication section has received the disaster information, sensitivity of the human body sensor is raised to a level higher than that before reception of the disaster information, wherein
   the controller controls the communication section to send detection information indicating an installation location of the image forming apparatus having detected the human body.

2. The image forming apparatus according to claim 1, wherein
   when the human body sensor has detected the human body after the sensitivity of the human body sensor has been raised, the controller controls the communication section to send the detection information to an external terminal, the detection information indicating that the human body has been detected.

3. The image forming apparatus according to claim 1, further comprising
   a display section, wherein
   when the communication section has received the disaster information, the controller controls the display section to display an image relating to the disaster information.

4. The image forming apparatus according to claim 3, wherein
   the image relating to the disaster information includes an image exhibiting an evacuation route.

5. The image forming apparatus according to claim 3, wherein
   the image relating to the disaster information includes one or more images of an installation location of a fire extinguisher, a guidance route to the fire extinguisher, an installation location of an automated external defibrillator, a guidance route to the automated external defibrillator, a location of emergency food storage, and a guidance route to the emergency food storage.

6. The image forming apparatus according to claim 1, wherein
   the image forming section includes a fixing section which applies heat and pressure to the recording medium to fix an image formed on the recording medium to the recording medium,
   the image forming apparatus has a first power mode and a second power mode which are power modes for supplying electric power to the fixing section,
   the first power mode is a power mode in which the electric power is applied to the fixing section such that preparation for fixing the image to the recording medium has been completed,
   the second power mode is a power mode in which the electric power is not supplied to the fixing section or the electric power is supplied to the fixing section at a lower level than in the first power mode, and
   when the communication section has received the disaster information, the controller prohibits the power mode from being set to the first power mode.

7. The image forming apparatus according to claim 6, further comprising
   a display section, wherein
   in a case where the human body sensor has detected the human body before the communication section receives the disaster information, the controller controls the display section to light up and sets the power mode to the first power mode, and
   in a case where the human body sensor has detected the human body after the communication section has received the disaster information, the controller controls the display section to light up and sets the power mode to the second power mode.

8. An image forming apparatus comprising:
   an image forming section configured to form an image on a recording medium;
   a human body sensor configured to detect a human body;
   a communication section configured to receive disaster information; and
   a controller configured to control the human body sensor such that, when the communication section has received the disaster information, sensitivity of the human body sensor is raised to a level higher than that before reception of the disaster information, wherein
   the image forming section includes a fixing section which applies heat and pressure to the recording medium to fix an image formed on the recording medium to the recording medium,
   the image forming apparatus has a first power mode and a second power mode which are power modes for supplying electric power to the fixing section,
   the first power mode is a power mode in which the electric power is applied to the fixing section such that preparation for fixing the image to the recording medium has been completed,
   the second power mode is a power mode in which the electric power is not supplied to the fixing section or the electric power is supplied to the fixing section at a lower level than in the first power mode, and
   when the communication section has received the disaster information, the controller prohibits the power mode from being set to the first power mode.

9. The image forming apparatus according to claim 8, wherein when the human body sensor has detected the human body after the sensitivity of the human body sensor has been raised, the controller controls the communication section to send detection information to an external terminal, the detection information indicating that the human body has been detected.

10. The image forming apparatus according to claim 8, further comprising a display section, wherein when the communication section has received the disaster information, the controller controls the display section to display an image relating to the disaster information.

11. The image forming apparatus according to claim 10, wherein the image relating to the disaster information includes an image exhibiting an evacuation route.

12. The image forming apparatus according to claim 10, wherein the image relating to the disaster information includes one or more images of an installation location of a fire extinguisher, a guidance route to the fire extinguisher, an installation location of an automated external defibrillator, a guidance route to the automated external defibrillator, a location of emergency food storage, and a guidance route to the emergency food storage.

13. The image forming apparatus according to claim 8, further comprising a display section, wherein in a case where the human body sensor has detected the human body before the communication section receives the disaster information, the controller controls the display section to light up and sets the power mode to the first power mode, and in a case where the human body sensor has detected the human body after the communication section has received the disaster information, the controller controls the display section to light up and sets the power mode to the second power mode.

* * * * *